United States Patent [19]

Sherman

[11] 4,380,725
[45] Apr. 19, 1983

[54] GENERATOR-BATTERY DC POWER SUPPLY SYSTEM

[75] Inventor: Moshe Sherman, Rishon le Zion, Israel

[73] Assignee: Israel Aircraft Industries, Ltd., Lod, Israel

[21] Appl. No.: 249,950

[22] Filed: Apr. 1, 1981

[30] Foreign Application Priority Data

Apr. 4, 1980 [IL] Israel ......................................... 59777

[51] Int. Cl.³ ........................... H02J 7/14; H02J 7/16; H02P 9/00
[52] U.S. Cl. ....................................... 320/35; 307/84; 320/64; 322/33
[58] Field of Search ...................... 322/28, 33; 320/35, 320/64, 68; 307/84

[56] References Cited
U.S. PATENT DOCUMENTS 3,496,447 2/1970 Thompson .................... 322/33 X
3,505,590 4/1970 Thompson .................... 322/33 X
4,156,836 5/1979 Wiley ............................ 322/90 X
4,220,908 9/1980 Nicol ............................. 322/33
4,237,412 12/1980 Rundlof ........................ 322/28

Primary Examiner—R. J. Hickey
Attorney, Agent, or Firm—Benjamin J. Barish

[57] ABSTRACT

A generator-battery DC power supply system comprises a plurality of sub-systems each including a battery and a temperature sensor sensing the temperature of the battery and controlling the generator regulating means to decrease the generator output voltage in response to an increase in the sensed battery temperature, to thereby prevent overheating of the battery by overcharging same. The system further includes a bus-tie-contactor for connecting the sub-systems in parallel, and control means effective to control all the generators in response to the highest-sensed temperature of any battery in the sub-systems. The illustrated system is particularly useful in electrical power supply systems on aircraft.

10 Claims, 4 Drawing Figures

GENERATOR-BATTERY DC POWER SUPPLY SYSTEM

BACKGROUND OF THE INVENTION

The present invention relates to power supply systems and particularly to such systems including a generator producing a DC output, a battery charged by the generator and supplying the power in case of failure or termination of operation of the generator, and generator regulating means regulating the output voltage of the generator. In aircraft power supply systems, the batteries may also be used for starting the aircraft and/or for providing power for auxiliary units.

Many batteries, particularly nickel-cadmium batteries, when connected to a bus bar at a constant potential, may overcharge such as to produce thermal runaway. This can result not only in the destruction of the battery, but also in an explosion. For this reason, the charge rate of the battery should be closely controlled particularly when the battery is used in an aircraft power supply system.

Some aircraft power supply systems do not include automatic control to prevent battery over-charging, but rather include generator control units which regulate the output of the generator to maintain a constant potential, the batteries being connectable to the buses by cockpit switches. Such systems however, suffer from the risk of thermal runaway because of battery overcharging, as noted above.

Conventional systems for preventing battery overcharging (e.g., of nickel-cadmium batteries) on aircraft usually include a battery charger for each battery. The charger is supplied from the aircraft bus and charges its battery according to a predetermined program, usually at a constant current until the battery attains a certain value indicating about 100% capacity, and then preserves this charge condition. Such aircraft systems also include a battery-line-contactor controlled by the battery charger, which contactor automatically connects the battery to the bus whenever the voltage on the bus drops below a certain level, or whenever a failure or termination of operation of the generator is experienced. Although such battery-charger systems have the advantage that they maintain the battery at about 100% capacity, they have a number of disadvantages. Thus, a special charger is required for each battery, which involves added weight and relatively high additional cost; in addition, the battery is neutralised from the bus bar and therefore does not participate in the transient phenomena nor serve as a filter, the result being a poor quality voltage on the buses; further a continuous voltage supply on the bus bars is not guaranteed, which can produce a loss of memory in data processing systems having a volatile memory; still further, a disconnect and connect logic between the battery and the bus bar is required, which can impair system reliability especially in the case of an emergency when power might be needed.

BRIEF SUMMARY OF THE INVENTION

An object of the present invention is to provide a generator-battery DC power supply system having advantages in one or more of the above respects.

According to a broad aspect of the present invention, there is provided a power supply system comprising a plurality of sub-systems, each including a generator producing a DC output voltage, a battery charged by the generator and supplying the power in case of failure or termination of operation of the generator, and generator regulating means regulating the output voltage of the respective generator. The batteries of all the sub-systems are connected in parallel. Each of the generator regulating means includes a temperature sensor sensing the temperature of its respective battery. The system further includes a comparator for comparing the outputs of all the temperature sensors and for determining the battery at the highest temperature; and a control circuit effective to control the generator regulating means of all the generators of the sub-systems to decrease their output voltages in response to an increase in the temperature of the battery having the highest temperature.

In the preferred embodiment of the invention described below, the system controls the generator regulating means of all the sub-systems to decrease the generator output voltages from a maximum value to a minimum value according to a predetermined rate in response to an increase in the sensed battery temperature of the highest-temperature battery. In the described embodiment, the predetermined rate varies in a substantially linear manner. For example, the minimum value may be between 80–95% of the maximum value, the described embodiment being one wherein it is about 90% of the maximum value.

It will thus be seen that in the novel system of the present invention, the generators are controlled so as to charge the batteries, not at a constant voltage as in the previously-mentioned conventional battery-charger system, but rather at a variable voltage depending upon the temperature of the battery cells. The voltage thus obtained on the aircraft buses will always be at such value so as to prevent over-charging and thermal runaway of the batteries.

Preferably, the variations between the maximum and minimum voltage is within the range of 80–95%, the described embodiment being about 90%, such that these variations in voltage will not affect the normal electrical loads served by the aircraft power supply system.

Such a system provides a number of important advantages over the conventional battery-charger system briefly mentioned above. Thus, in the novel system, no special battery-chargers are needed, thereby effecting a savings in space, weight and cost. Further, each battery is continuously connected to the aircraft bus so as to participate in the transient phenomena occurring on the buses, thereby contributing a filtering function and producing a better quality aircraft voltage. Further, an uninterrupted voltage supply is better assured, thereby avoiding the possibility of loss of memory in any data-processing system having a volatile memory. Still further, the connect and disconnect logic of the battery need not be changed in the existing aircraft (i.e., the control switch may remain in the cockpit), which improves system reliability.

Further features and advantages will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
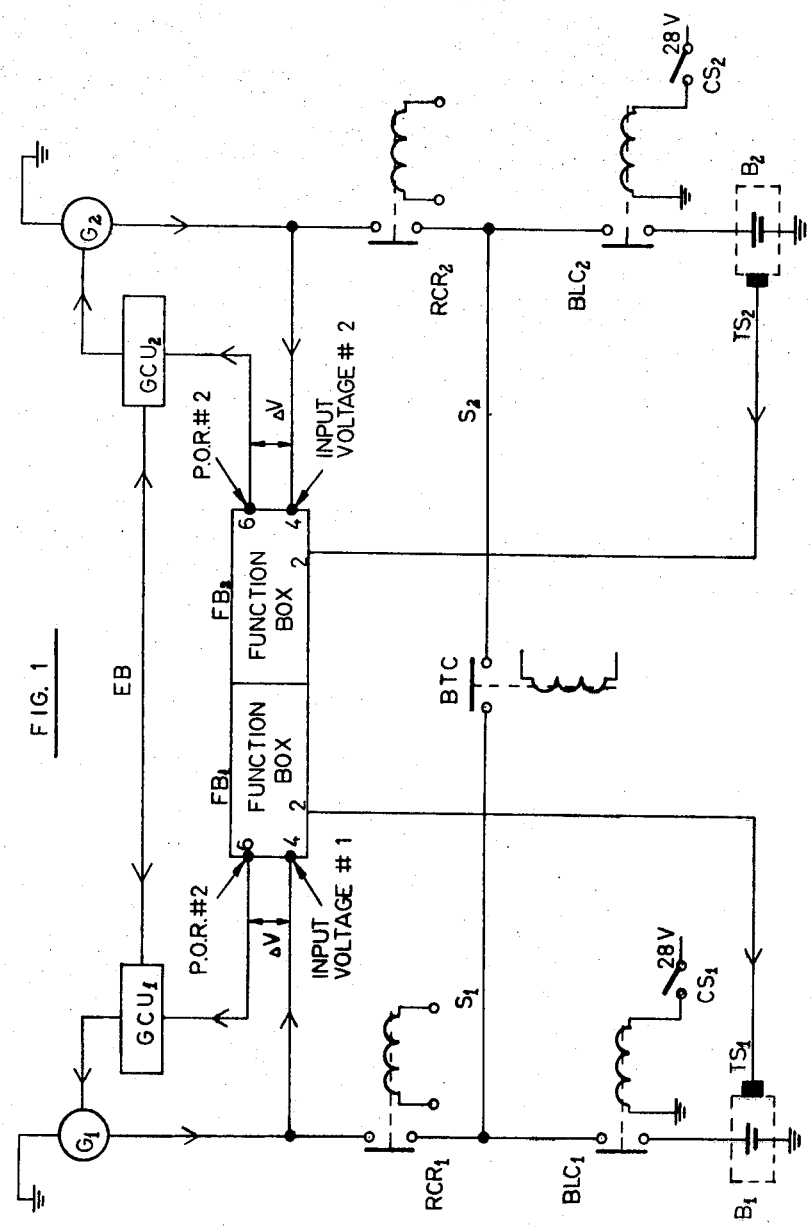
FIG. 1 is a block diagram illustrating one form of DC generator-battery power supply system constructed in accordance with the invention particularly useful for aircraft.

The aircraft DC power supply system illustrated in FIG. 1 includes, for purposes of example, two sub-systems connectable in parallel, each including a generator $G_1$, $G_2$ supplying a DC voltage to its bus $S_1$, $S_2$, respectively. The two buses are selectively connectable together by a bus-tie-contactor BTC which thereby connects the sub-systems in parallel. Each generator sub-system further includes a battery $B_1$, $B_2$, respectively, which is charged by its generator and supplies the power in case of failure or termination of operation of its generator. A reverse-current relay $RCR_1$, $RCR_2$, disconnects each generator from its bus $S_1$, $S_2$ and its battery $B_1$, $B_2$, should the generator output voltage drop below the bus voltage, to prevent reverse-current flow back into the generator. In addition, each battery $B_1$, $B_2$ may be selectively connected to or disconnected from its respective bus $S_1$, $S_2$ by a battery-line-contactor $BLC_1$, $BLC_2$, operated by cockpit switches $CS_1$, $CS_2$.

The system insofar as described above is well-known, and therefore further details of its construction and operation are not deemed necessary.

Such systems frequently include a generator control unit for each generator, corresponding to units $GCU_1$, $GCU_2$ in FIG. 1, connected together by an equalizer bus EB. These units regulate the output voltage of the respective generator by control means which maintains the voltage at a certain point, called the point-of-regulation (POR), at predetermined fixed reference value, and which in turn produces an output controlling the field current of the generator in response to said control means. As indicated earlier, the known systems usually either regulate the generator to provide a constant voltage on the output buses, and thereby charge the batteries at a constant voltage, or include a battery-charger for each battery supplied from the corresponding bus and charging its battery according to a predetermined program. Such known systems and their disadvantages have been briefly described above.

In the system illustrated in FIG. 1 constructed in accordance with the present invention, the generator regulating means for regulating the output voltage of the generators includes a temperature sensor sensing the temperature of the corresponding battery and controlling the generator regulating means to decrease the generator output voltage in response to an increase in the sensed battery temperature. Both over-charging and over-heating of the batteries are thus prevented.

The system illustrated in FIG. 1 is particularly useful for existing aircraft, in order to convert them to provide the foregoing operation and advantages of the present invention. Thus, in order to convert existing aircraft, it is only necessary to introduce a function box $FB_1$, $FB_2$, for each generator sub-system, which function box receives an input at its input terminal 2 from a temperature sensor $TS_1$ and $TS_2$ provided for each of the batteries $B_1$, $B_2$ respectively. Each function box includes a second input terminal 4 receiving a signal corresponding to the output voltage produced by its corresponding generator $G_1$, $G_2$. The function box in turn produces a voltage ($\Delta V$) varying according to the desired decrease in the generator output voltage in response to an increase in temperature, subtracts this voltage ($\Delta V$) from the generator output voltage, and applies this difference, appearing on its output terminal 6, to the point-of-regulation (POR) input terminal of the respective generator control unit $GCU_1$, $GCU_2$. The latter units may be of a known design, namely one varying the field current to the respective generator in order to vary its output voltage in response to the control exerted by it to maintain the POR terminal at the predetermined fixed reference level, except that instead of receiving the POR input voltage from the generator input directly, it receives it from the respective function box $FB_1$, $FB_2$.

Figure 2:
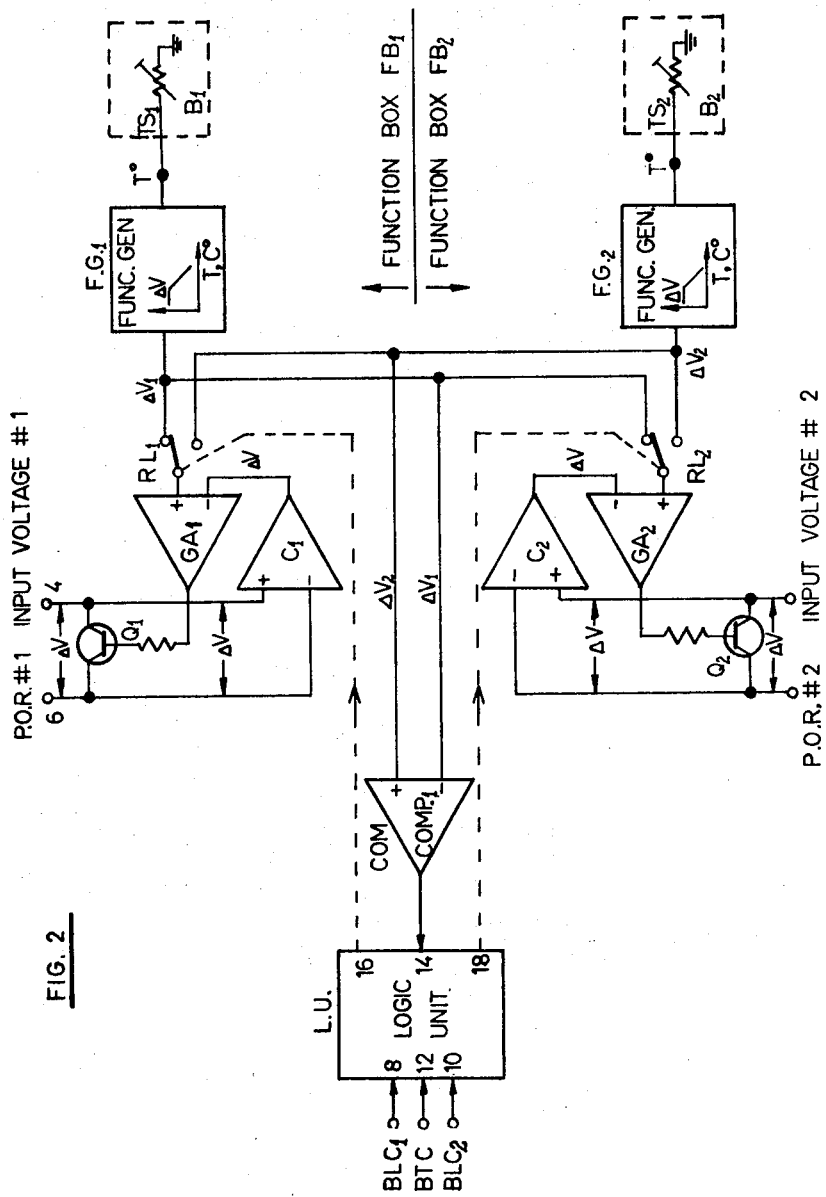
FIG. 2 is a block diagram of the two function boxes in FIG. 1.

FIG. 2 is an internal schematic diagram more particularly illustrating the two function boxes $FB_1$, $FB_2$. It will be seen that each includes a function generator $FG_1$, $FG_2$, receiving the signal from the respective battery temperature sensor $TS_1$, $TS_2$. Each of the function generators $FG_1$, $FG_2$ produces an output signal in accordance with the manner in whch the generator output (bus) voltage is to be varied by regulating the respective generator $G_1$, $G_2$, in response to the sensed battery temperature.

Figure 3:
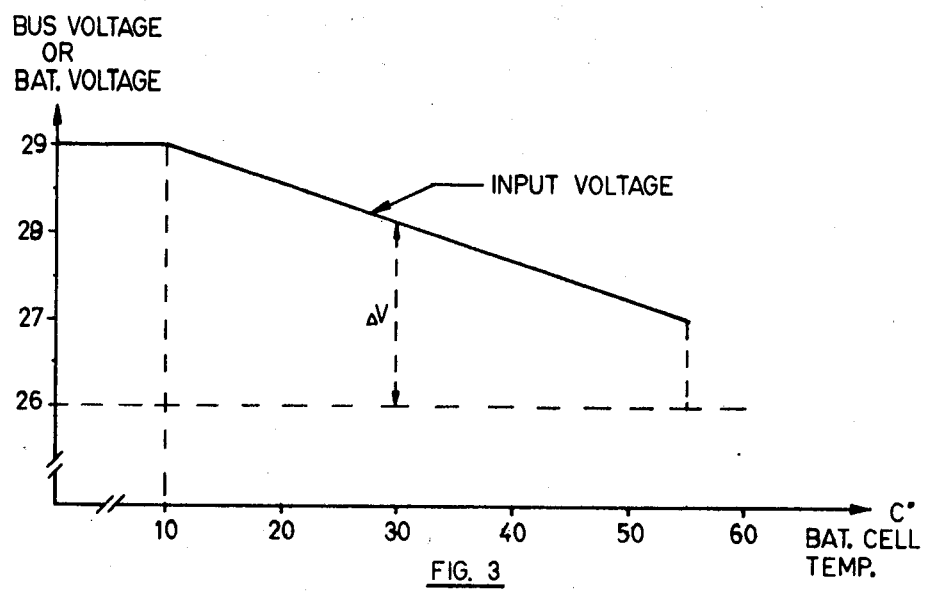
FIG. 3 is a curve illustrating the manner in which the bus voltage varies with the battery cell temperature in the system of FIG. 1.

FIG. 3 illustrates one relationship that may be provided. This relationship is particularly useful for a twenty-cell nickel-cadmium battery allowing a variation of the generator output voltage to be restricted to provide about 90% battery capacity. Thus, as seen in FIG. 3, the maximum output voltage would be at 29 volts up to a battery cell temperature of 10° C., and would then decrease in a substantially linear manner with an increase in temperature to about 55° C., at which point the output voltage would be at its minimum value, slightly more than 27 volts.

As indicated earlier, existing aircraft equipped with generator control units ($GCU_1$, $GCU_2$) operate at a fixed voltage (e.g. 28 volts), and therefore the POR input terminal of the respective GCU would be controlled to maintain a fixed voltage. This fixed voltage may be pre-set downwardly to 26 volts, to thereby serve as the fixed reference voltage (26 volts) in the curve of FIG. 3. The temperature-sensitive voltage ($\Delta V$) generated by the respective function box $FB_1$, $FB_2$, varying according to the temperature of its battery $B_1$, $B_2$ as sensed by its temperature sensors $TS_1$, $TS_2$, is subtracted by this function box from the bus voltage and the difference is applied to the POR terminal of the generator control unit, so that the latter unit, while maintaining the POR terminal at the fixed pre-set level, also thereby controls the generator to vary its output with any change in the sensed temperature. Thus, this embodiment of the invention permits the use of the presently-available generator control units.

FIG. 3 illustrates the temperature cut-off point at 55° C. The temperature should never exceed this maximum value if the system is properly operating it, but the aircraft may nevertheless be equipped with an emergency indicator, alarm, and/or other back-up safety system (not shown) in case this temperature is ever exceeded.

Figure 4:
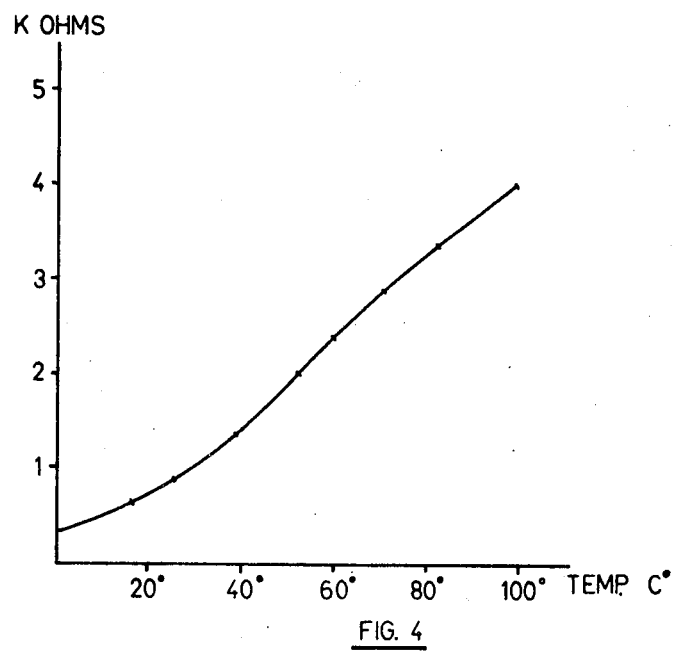
FIG. 4 is a curve illustrating typical characteristics of the temperature sensor used in the system of FIG. 1.

FIG. 4 illustrates the characteristics of a thermo-resistor which may be used for the battery temperature sensors $TS_1$, $TS_2$. It will be seen that the resistance of the thermo-resistor also varies with temperature in an approximately linear manner.

The construction of function generators to provide any desired input-output characteristic, such as illustrated in FIG. 3, and the construction of thermo-resistors having the characteristics illustrated in FIG. 4, are both well known in the art.

Returning to FIG. 2, it will be seen that each of the function boxes $FB_1$, $FB_2$ also includes the following: relays $RL_1$, $RL_2$; gated amplifiers $GA_1$, $GA_2$ controlled by comparators $C_1$, $C_2$; and transistors $Q_1$, $Q_2$ whose output terminals constitute the terminals 6 in FIG. 1 connected to the POR terminal of the respective generator control units $GCU_1$, $GCU_2$.

The relays $RL_1$, $RL_2$ are controlled by a logic unit LU, as will be described more particularly below, and determine which of the $\Delta V_1$ or $\Delta V_2$ voltage signals from the respective function generators $FG_1$, $FG_2$ will be directed to control both $GCU_1$ and $GCU_2$. The gated amplifiers $GA_1$, $GA_2$ receive the selected $\Delta V_1$ or $\Delta V_2$ signal, as controlled by the relays $RL_1$, $RL_2$ and a comparator COM, and apply the selected latter signal to the base of the transistors $Q_1$, $Q_2$. The amplifiers $GA_1$, $GA_2$ are enabled by their respective comparators $C_1$, $C_2$ such that the $\Delta V$ output of the transistors $Q_1$, $Q_2$ will be equal to $\Delta V_1$ or $\Delta V_2$, as selected by comparator COM.

The logic unit LU receives a number of inputs, as follows: on its input terminals 8, 10, it receives information concerning the status of the battery-line-contactors $BLC_1$, $BLC_2$; on its input terminal 12, it receives information concerning the status of the bus-tie-contactor BTC; and on its input terminal 14, it receives information from comparator COM, which comparator in turn compares $\Delta V_1$ with $\Delta V_2$ from the function generators $FG_1$, $FG_2$ indicating the sensed temperature at the respective batteries.

The logic unit LU, in turn, produces outputs at its two terminals 16, 18, controlling the two relays $RL_1$, $RL_2$ in the function boxes of the respective generator system, according to the following truth table:

TABLE 1

| | LOGIC UNIT TRUTH TABLE | | | | |
|---|---|---|---|---|---|
| | $BLC_1$ | $BLC_2$ | BTC | $\Delta V_2 > \Delta V_1$ | $RL_1$ | $RL_2$ |
| 1. | 1 | 1 | 1 | 1 | 0 | 1 |
| 2. | 0 | 1 | 1 | 1 | 1 | 0 |
| 3. | 1 | 0 | 1 | 1 | 0 | 1 |
| 4. | 0 | 0 | 1 | 1 | X* | X* |
| 5. | 1 | 1 | 0 | 1 | 0 | 0 |
| 6. | 0 | 1 | 0 | 1 | X | 0 |
| 7. | 1 | 0 | 0 | 1 | 0 | X |
| 8. | 0 | 0 | 0 | 1 | X | X |
| 9. | 1 | 1 | 1 | 0 | 1 | 0 |
| 10. | 0 | 1 | 1 | 0 | 1 | 0 |
| 11. | 1 | 0 | 1 | 0 | 0 | 1 |
| 12. | 0 | 0 | 1 | 0 | X* | X* |
| 13. | 1 | 1 | 0 | 0 | 0 | 0 |
| 14. | 0 | 1 | 0 | 0 | X | 0 |
| 15. | 1 | 0 | 0 | 0 | 0 | X |
| 16. | 0 | 0 | 0 | 0 | X | X |

The above table is represented by the following functions:

1. $RL_1 = \overline{BLC_1} + BLC_2 \cdot BTC (\overline{\Delta V_2 > \Delta V_1})$
2. $RL_1 = BLC_1 \cdot BTC \cdot (\Delta V_2 > \Delta V_1) + BLC_2$
*$RL_1 = RL_2$ Condition 1 in the above truth table indicates the following: both batteries $B_1$, $B_2$ are connected to their respective buses $S_1$, $S_2$ ($BLC_1$ and $BLC_2=1$); the two generator-battery subsystems are connected in parallel (BTC=1); and $\Delta V_2$ is higher than $\Delta V_1$, which means that the temperature sensed at battery $B_1$ is higher than that sensed at battery $B_2$. In such a condition, the logic unit LU will non-actuate relay $RL_1$, and will actuate relay $RL_2$, so that the $\Delta V_1$ signal, representing the temperature sensed at battery $B_1$, will be applied to the two amplifiers $GA_1$ and $GA_2$ thereby controlling both of the generator control units $GCU_1$, $GCU_2$ in accordance with the temperature sensed at battery $B_1$. Thus, both generators $G_1$ and $G_2$ will be controlled in accordance with the temperature at battery $B_1$, which is the higher temperature of the two batteries.

Condition 2 illustrates the same except that battery $B_1$ is disconnected from its bus $S_1$ ($BLC_1=0$), whereupon relay $RL_1$ will be actuated and relay $RL_2$ will be non-actuated, so that the temperatures sensed at battery $B_2$ will control both generators $G_1$ and $G_2$. Condition 3 illustrates the converse condition wherein battery $B_2$ is disconnected ($BLC_2=0$), in which case relay $RL_1$ will be non-actuated and relay $RL_2$ will be actuated, so that both generators $G_1$, $G_2$ are controlled by the temperature at battery $B_1$, the same as in Condition 1 above.

Condition 4 illustrates both of the batteries $B_1$, $B_2$ being disconnected from their respective buses $S_1$, $S_2$. In this case, both relays $RL_1$ and $RL_2$ will be placed in the same condition by the logic unit, it being non-significant whether they are actuated or non-actuated since neither of the battery temperatures will control the generators $G_1$, $G_2$.

Condition 5 illustrates both batteries $B_1$ and $B_2$ being connected to their respective buses $S_1$, $S_2$ as in Condition 1 above, except that the bus-tie-contactor is not-actuated (BTC=0) so that the two generator-battery sub-systems are not connected in parallel but are each functioning independently. In this case, both of the relays $RL_1$ and $RL_2$ are non-actuated, so that the temperature-signal $\Delta V_1$ from battery $B_1$ will control its generator $G_1$, and the temperature-signal $\Delta V_2$ from battery $B_2$ will control its generator $G_2$.

Condition 6 illustrates the same as Condition 5 except that battery $B_1$ is not connected, so that relay $RL_2$ will be non-actuated to cause the temperature at battery $B_2$ to control its generator $G_2$, whereas the condition of relay $RL_1$ is non-significant since its battery $B_1$ is disconnected. Condition 7 illustrates the opposite, namely battery $B_2$ is disconnected, so that the condition of its relay $RL_2$ is non-significant. Condition 8 indicates both batteries $B_1$ and $B_2$ being disconnected, in addition to the two sub-systems being disconnected from each other, so that the condition of both relays $RL_1$ and $RL_2$ is non-significant.

Conditions 9–16 repeat the above Conditions 1–8 except $\Delta V_1$ is greater than $\Delta V_2$, which means that the temperature sensed at battery $B_2$ is higher than that sensed at battery $B_1$. The control of the relays $RL_1$ and $RL_2$ during these conditions, as set forth in the truth table 1, will be understood from the above description.

As indicated earlier, the generator control units $GCU_1$, $GCU_2$ may be one of the commercially available units, such as General Electric Unit 3S2060D168D1, or Lear Siegler Unit 51509-002.

While FIG. 1 illustrates the invention as embodied in a system for converting existing aircraft power supplies of the type including generator control units (this being done by merely introducing the function boxes $FB_1$, $FB_2$ as described above), it will be appreciated that the generator control units could be designed so as to incorporate the functions of the function boxes. Further, while FIG. 1 illustrates a system including two generator-battery sub-systems connectable in parallel, it will be appreciated that the invention could also be incorporated into a single generator-battery system, or one including more than two such sub-systems.

Many other variations, modifications and applications of the invention will be apparent within the scope of the appended claims.

What is claimed is:

1. A power supply system comprising a plurality of sub-systems; each sub-system including a generator producing a DC output voltage, a battery supplying the power in case of failure or termination of operation of the generator, and generator regulating means regulating the output voltage of its respective generator; circuit means connecting the batteries of all said sub-systems in parallel; each of said generator regulating means including a temperature sensor sensing the temperature of its respective battery; comparator means for comparing the output of said temperature sensors and for determining the battery at the highest temperature; and control means effective to control the generator regulating means of all the generators of said sub-systems to decrease their output voltages in response to an increase in the temperature of the battery in the sub-system having the highest temperature, to thereby prevent over-heating of any of the batteries by over-charging them.

2. A power supply system according to claim 1, wherein said temperature sensor of the highest temperature battery controls the generator regulating means of all said generators to decrease the generator output voltages from a maximum value to a minimum value according to a predetermined rate in response to an increase in the highest sensed battery temperature.

3. A system according to claim 2, wherein said predetermined rate varies in a substantially linear manner, and said minimum value is 80–95% of said maximum value.

4. A system according to claim 3, wherein said minimum value is about 90% of said maximum value.

5. A system according to claim 1, wherein said generator regulating means in each sub-system further includes a generator control unit having a point-of-regulation input terminal controlling the field current through its respective generator; said control means including means for maintaining each of said terminals at a fixed reference value but effective to vary the voltage on all said terminals to control the field current through all the generators in response to an increase in the temperature of the highest-temperature battery.

6. A system according to claim 5, wherein said generator regulating means in each sub-system also includes a function generator connected to produce a voltage varying according to the desired decrease in the generator output voltage in response to an increase in temperature of the highest temperature battery, said function generator subtracting the temperature-varying voltage from the generator output voltage of the respective generator and applying this difference to the point-of-regulation input terminal of each generator control unit.

7. A system according to claim 6, wherein said generator regulating means in each sub-system further includes a transistor having an input connected to the function generator of the respective sub-system and an output connected to the point-of-regulation input terminal of the respective generator control unit.

8. A system according to claim 1, wherein said circuit means for connecting the batteries of all said sub-systems in parallel includes a selectively actuable bus-tie-contactor.

9. A system according to claim 1, further including a battery-line-contactor for connecting or disconnecting each battery with respect to its respective generator.

10. A system according to claim 9, wherein said control means comprises a logic unit having an input from said comparator, from each of said battery-line-contactors, and from said bus-tie-contactor.

* * * * *